United States Patent [19]

Lamb

[11] 4,385,816
[45] May 31, 1983

[54] SLIDE PREVIEWER, SORTER, AND STACK LOADER

[76] Inventor: Owen L. Lamb, Box 66737, Scotts Valley, Calif. 95066

[21] Appl. No.: 336,800

[22] Filed: Jan. 4, 1982

[51] Int. Cl.³ .............................................. G03B 23/02
[52] U.S. Cl. .................................... 353/112; 353/111; 353/21
[58] Field of Search ............... 353/103, 111, 112, 113, 353/21; 40/361, 362, 366, 367, 508, 497, 500, 509, 513

[56] References Cited

U.S. PATENT DOCUMENTS

| | | | |
|---|---|---|---|
| 3,276,314 | 10/1966 | Robinson | 353/111 X |
| 3,591,275 | 7/1971 | Badalich | 353/21 |
| 3,858,970 | 1/1975 | Collier | 353/113 X |
| 4,249,329 | 2/1981 | Lamb | 353/112 X |
| 4,338,738 | 7/1982 | Lamb | 40/476 X |

*Primary Examiner*—Stephen Marcus
*Assistant Examiner*—William R. Sharp
*Attorney, Agent, or Firm*—Owen L. Lamb

[57] ABSTRACT

A slide previewer/sorter/stack loader having a holder (18) which is adapted to receive two photographic slides in first and second receptacles at one end thereof. The holder is initially positioned at an angle above horizontal so that a first slide placed on a chute (16, 17) will drop into the first receptacle by force of gravity. When in the initial position, the slide in the holder is illuminated by a back light so that the slide can be previewed through a window in the holder and edited. The holder pivots in such a manner that the second receptacle can be positioned over a slide slot (28) above a projector. Means (26) are provided to restrain the slide in the first receptacle during transit from the initial viewing position to the position wherein the second receptacle is positioned over the slide slot. A second slide in the projector is forced upward by the projector slide lifter mechanism into the second receptacle in the holder, and is retained therein by a latch (52). The holder is then moved by the projector tray indexing mechanism (78) to position the first receptacle over the slide slot. The first slide in the first receptacle is then lowered into the projector by the projector slide lifter mechanism for projection. The holder is then returned to its initial position, and the second slide drops out of the second receptacle into a bin in a tray (29). The cycle is repeated to project successive slides.

14 Claims, 8 Drawing Figures

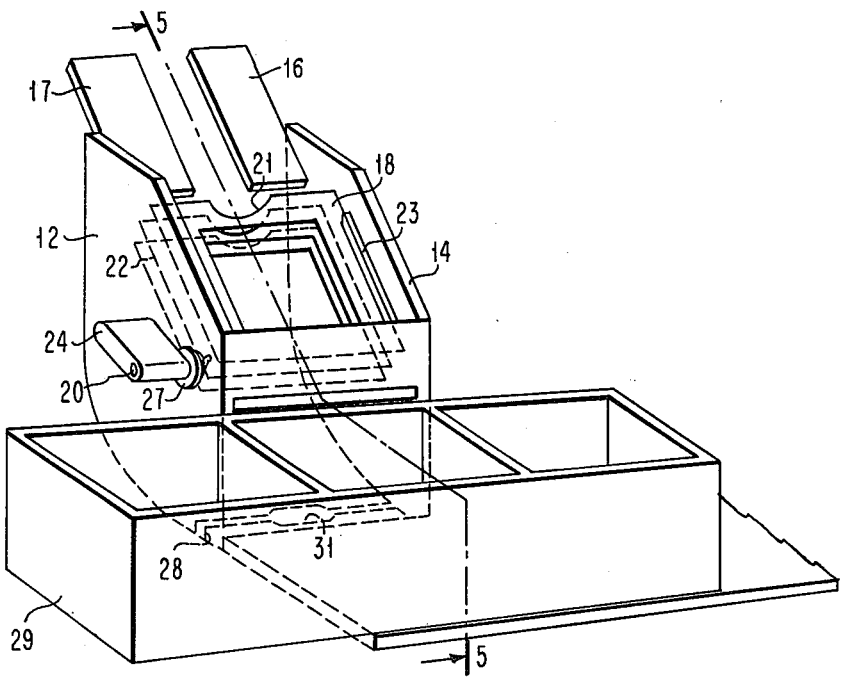
FIG.1
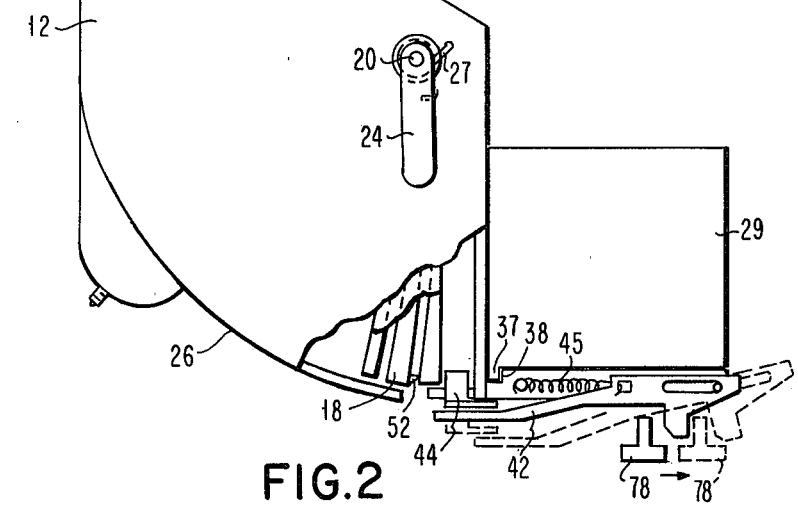
FIG.2
FIG.3

SLIDE PREVIEWER, SORTER, AND STACK LOADER

BACKGROUND OF THE INVENTION

The present invention relates to apparatus for previewing, editing, projecting, and sorting photographic slides, and more particularly, to an apparatus for stack-loading slides into a slide projector.

Several types of modern photographic slide projectors utilize slide trays. The slide trays are generally made of plastic with spaced compartments for holding individual slides. During projection the slides in the compartment are sequentially removed from the compartment by the slide projector mechanism and transported inside the projector for projection. After projection, the slide is transferred back to the tray and the next sequential slide is selected. Slide trays may be either linear or circular in shape.

U.S. Pat. No. 3,276,314 "Automatic Slide Projector," assigned to Eastman Kodak Company, which issued on Oct. 4, 1966, to H. T. Robinson, describes an automatic slide projector known by the Kodak trademark "Carousel" projector. Carousel projectors have a reputation for reliability. This reliability is achieved by utilizing a slide tray which holds slides individually in separate compartments, so that they do not touch each other and bind. Slides are placed into the tray from above. Slides are dropped into the projector through a slide gate in the projector from an opening in the bottom of the tray by force of gravity and by means of a slide lifter which lowers the slide through the gate into the projector. After projection, the lifter moves the slide up through the gate into the compartment in the tray and the entire circular tray is rotated so that the next slide compartment is positioned over the slot.

This mechanism results in very reliable operation because the slides are held vertically at all times from the compartment in the tray to the projection station within the projector.

Kodak also sells a stack loader for use with its Carousel projectors. The stack loader allows up to forty slides to be projected without using a slide tray. The slides in the stack loader are stacked on end in the Kodak stack loader. Since the slides are not held in separate compartments they have a tendency to stick to one another, so that sometimes a slide will not drop into the projector or will not come entirely out of the projector. This causes jamming and interruption of projection. Also, the Kodak stack loader will accept only forty slides at a time. More slides cannot be inserted until the stack loader has emptied itself, so that continuous, uninterrupted projection of more than forty sequential slides is not possible. Furthermore, editing and sorting of slides is not possible at all with the Kodak stack loader.

U.S. Pat. No. 4,249,329 entitled "Apparatus for Viewing and Sorting Photographic Slide Transparencies," of Owen L. Lamb, which issued on Feb. 10, 1981, discloses an apparatus for previewing and sorting slides, but no means are provided for loading the slides into a projector.

U.S. Pat. No. 4,338,738 entitled "Slide Previewer and Tray Loader", which was granted to Owen L. Lamb on July 13, 1982, discloses an apparatus for previewing slides and for loading the slides into a slide tray, but no means are provided for loading the slides into a projector and for sorting slides removed from the projector.

It is an object of the present invention to provide a slide-handling device which can be used to preview and edit slides, load and unload a slide projector, and sort the slides.

It is a further object of this invention to provide a slide previewer, sorter, and stack loader which operates primarily by force of gravity, thereby eliminating the need for complicated mechanisms.

It is a further object of this invention to provide a stack loader in which any number of slides can be sequentially projected without interruption.

SUMMARY OF THE INVENTION

Briefly, the above objects are accomplished in accordance with the invention by providing holding means having first and second slide receptacles for holding two separate photographic slides. A first slide is dropped into the first receptacle while the holding means is held in a first-viewing position at an angle to the horizontal plane. When in this initial position, a slide in the holder is illuminated by a back light so that the slide can be previewed and edited. Means are provided for rotating the holding means in the vertical plane to a second position such that the second receptacle is positioned above a slide gate in a photographic slide projector. Restraining means restrain the first slide in the first receptacle in the holding means during rotation. A second slide in the projector is forced upward by the projector slide lifter mechanism into the second receptacle in the holder, and is retained therein by a latch. The holder is then moved by the projector tray indexing mechanism to a third position in which the first receptacle (containing the first slide) is positioned over the slide gate of the projector. The first slide in the first receptacle is then lowered into the projector by the projector slide lifter mechanism for projection. The holder is then returned to its initial position, carrying the second slide in the second receptacle with it. When the holder reaches its initial preview position, the second slide drops out of the second receptacle into one bin selected from a plurality of sorting bins. The cycle is repeated to project successive slides.

In accordance with an aspect of the invention, the apparatus is provided with a chute oriented on an incline to horizontal which is adapted to receive a slide at one end thereof. The other end of the chute is positioned in alignment with the first slide receptacle in the holding means when the holding means is in position for previewing. Thus, a slide dropped onto the chute slides by force of gravity into the first receptacle in the holding means.

In accordance with another aspect of the ivention, the holding means is provided with an opening in the end of the second receptacle opposite to said latched end, which opening is positioned in alignment with a bin in a sorting tray, when the holding means is in position for previewing. Thus, a slide in the second receptacle drops by force of gravity into the bin in the sorting tray when the holding means is in position for viewing. In this manner, the first receptacle functions to load the projector with successive slides for projection, whilst the second receptacle functions to unload successive slides from the projector and drop them into sorting bins in a tray.

The invention has the advantage that it contains very few moving parts, relying mainly on the force of gravity to drop the slides into the projector and to sort the slides into the bins of the sorting tray.

The invention has the further advantage that slides are held in separate compartments and therefore cannot stick to one another. The mechanism equals the reliability of the Carousel tray with its separate compartments. This virtually eliminates jamming and interruption of projection. Also, the stack loader of the present invention will accept slides continuously, so that continuous, uninterrupted projection of sequential slides is possible. Furthermore, editing and sorting of slides is possible with the stack loader of the present invention.

BRIEF DESCRIPTION OF THE DRAWINGS

The foregoing and other objects, features, and advantages of the invention will be apparent from the following detailed description of preferred embodiments of the invention as illustrated in the accompanying drawings wherein:

FIG. 1 is a perspective view of a first embodiment of the invention;

FIG. 2 is a left-side view of the slide previewer/sorter/stack loader of FIG. 1;

FIG. 3 is a detailed drawing, in perspective, of the slide holder indexing mechanism shown in FIG. 2;

DESCRIPTION

Referring to FIG. 1, the previewer/sorter/stack loader has a housing made of a structural material, such as a relatively stiff sheet plastic, glued together to form a frame. Within the two walls (12 and 14) of the frame, there is an inclined chute (16, 17) set at an angle, for example, 30 degrees, with the horizontal.

Figure 4:
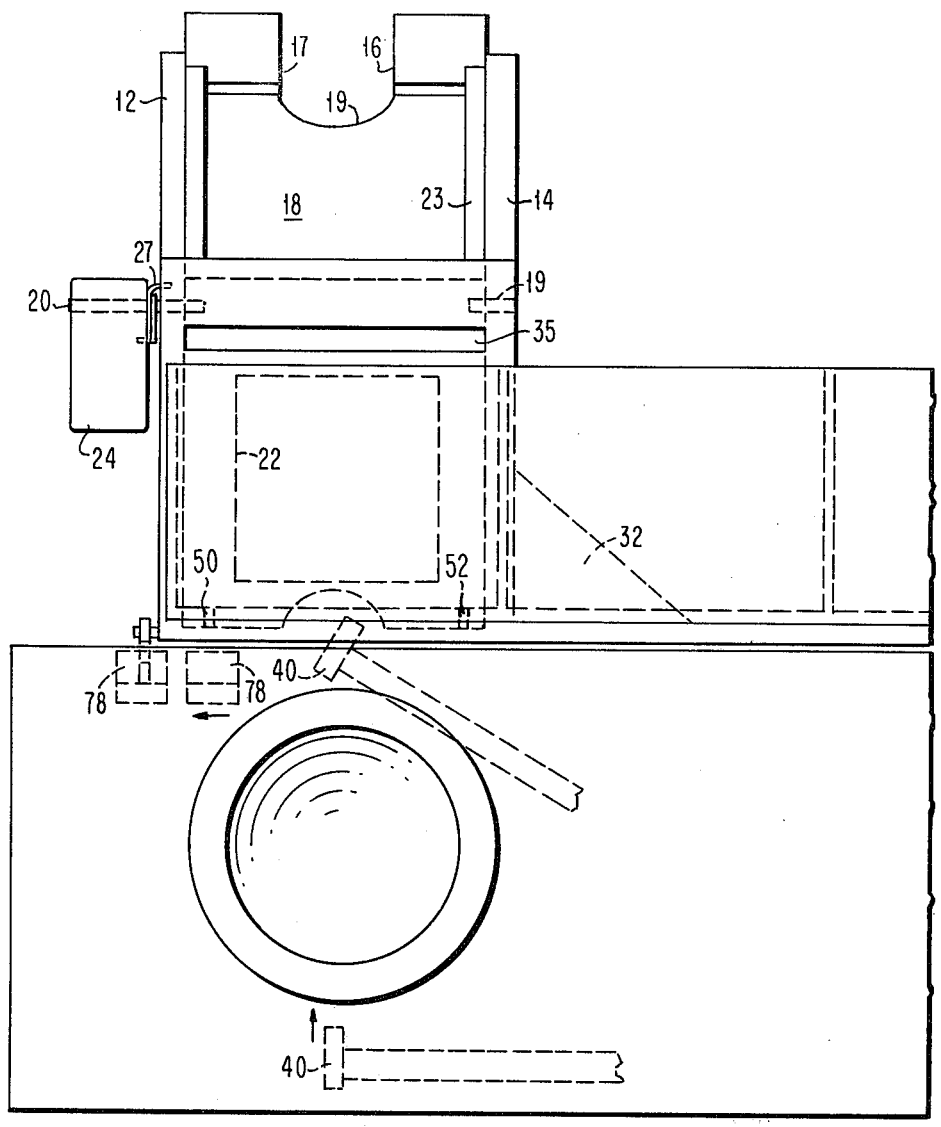
FIG. 4 is a front view of the slide previewer/sorter/stack loader of FIG. 1.
Figure 5:
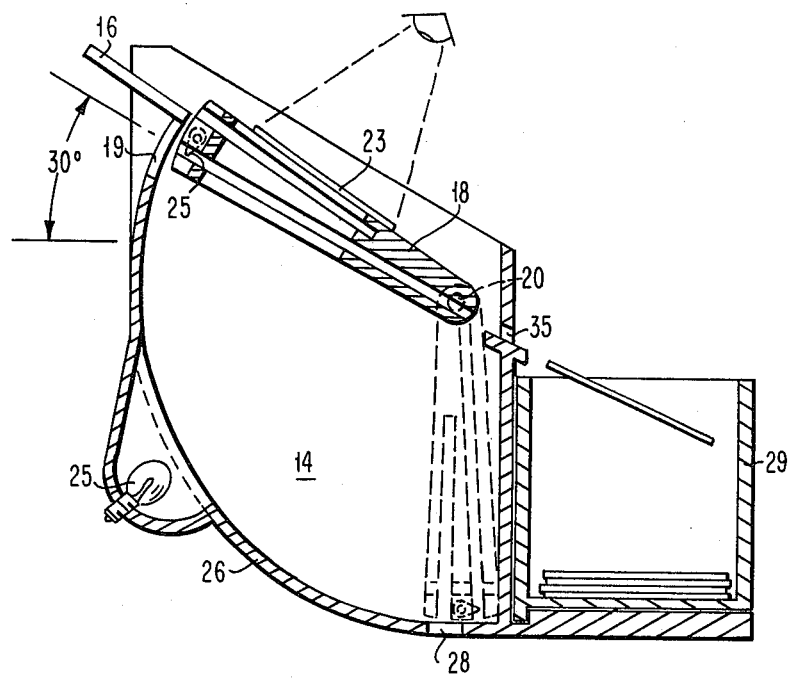
FIG. 5 is a vertical section taken through the slide previewer/sorter/stack loader as indicated by Line 2—2 of FIG. 1.

At the lower end of the chute there is provided a slide holder (18). The holder (18) is rotatably mounted by means of pins (19, 20), which extend therefrom and pass through holes in the wall portions (12 and 14). One of the pins (20) is attached to a lever (24). The holder (18) has two receptacles for holding slides. The first receptacle is aligned with the chute (16) when the holder is against the limit stop (23), as shown in FIG. 5. The second receptacle is aligned with the opening (35) when the holder is against the limit stop (23). The second receptacle is provided with pivotally-mounted latches (50, 52, FIG. 4) to keep a slide in the receptacle from dropping out through the slot (28).

The slide holder (18) may be made out of transparent plastic, with or without a window (22) cut therein, to provide a viewing station through which light from a light source (25) can pass to illuminate a transparency placed in the holder.

A coil spring (21) is provided to urge the lever (24) in a clockwise direction to thus maintain the slide holder (18) against the limit stop (23) so that it is normally held in the preview/sort position.

The housing is secured to a slide projector by means of a brace portion (32, FIG. 4) attached to the inner wall (14). The housing may be removably attached to the projector in a manner similar to that by which a circular slide tray is attached, as described in the above-referenced Robinson patent.

A removable slide tray (29) is slidable attached to the housing (12) by means of a tongue (37, FIG. 2) which fits into a groove (38) in the base of the housing. The slide tray has bins for storing separate stacks of slides, one of the bins at a time being positioned in front of an opening (35) cut in the housing, large enough for a slide to pass through.

The housing has a curved slide-restraining portion (26) which is provided with a slot (28) at the lower end thereof. The slot (28) is positioned above and in alignment with an opening in the projector. The slot (28) is contoured as shown (31) to match the opening in the slide projector. This shape allows room for the slide-lifter mechanism (40, FIG. 4) in the projector to pass part way through the slot (28). When the holder (18) is moved to the vertical position above and in alignment wih the opening in the projector, shown by the dotted lines in FIG. 2, a slide in the first receptacle of the holder (18) will be carried by the lifter mechanism through the slot (28) into the opening in the projector. The receptacles are made to be substantially perpendicular to the curved portion (26) so that a slide will pass into and out of the respective receptacles without binding.

In order to view a number of slides, edit them, and load them into the projector, the slide is first dropped onto the chute (16, 17). This may be done manually, or the slide previewer/sorter/stack loader shown in FIG. 1 may be equipped with a slide hopper which allows slides to be dropped automatically, one-by-one, onto the chute (16). A suitable mechanism for this purpose is described in the above-referenced U.S. Pat. No. 4,249,329. The slide travels down the chute (16, 17) by force of gravity into the first receptacle in the holder (18). The slide may be removed from the receptacle manually and reoriented or removed for editing by gripping the portion of the slide that protrudes from the cutout portion (21) in the holder. After viewing, the slide may be loaded into the projector by depressing the lever (24) which causes the holder (18) to move to the vertical position shown in FIG. 6, such that the second receptacle is located above the opening in the projector.

If there is a slide in the projector, it must first be removed before the slide in the first receptacle can be projected. As described in the above-identified Robinson patent, when the forward button on the projector is pressed, the slide lifter (40), shown in FIG. 4, moves upward in the direction of the arrow, and the slide indexing projection (78) moves out to the left, as shown by the arrow in FIG. 4, and forward, shown by the arrow in FIG. 2. Therefore, to remove a slide from the projector and insert a new slide, the forward button on the projector is pressed. This can be done manually by the operator while holding the lever (24) depressed, or a switch, connected to the forward circuitry, can be provided which will actuate when the lever (24) is fully depressed, to automatically start the projector's forward cycle of operation. Starting the projector's forward cycle of operation will cause the slide lifter (40), shown in FIG. 4, to move upward, forcing the slide (41) out of the projector and into the second receptacle in the holder. This slide (41) will be retained in the second receptacle by the latches (50, 52).

Figure 6:
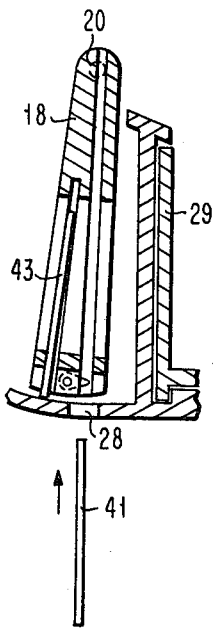
FIG. 6 is a detail of FIG. 5 showing the slide holder in a first position wherein a slide is lifted from the projector.
Figure 7:
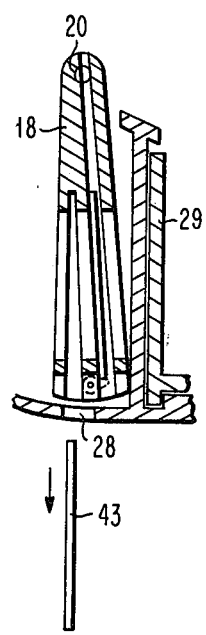
FIG. 7 is detail of FIG. 5 showing the slide holder in a second position wherein a slide is lowered into the projector; and, FIG. 8 is a vertical section taken through a second embodiment of the slide previewer/sorter/stack loader.

Referring to FIG. 2, a stop (44) is inserted through an opening in the bottom of the housing, which stops and registers the slide holder in a first substantially vertical position shown in FIG. 6. A holder indexing lever (42) forces the stop (44) upward in position, by action of the spring (45). The stop (44) and the holder indexing lever (42) are shown in detail in FIG. 3. During the projector's forward cycle of operation, the tray indexing mechanism projection (78), shown in FIGS. 2 and 4, moves out and engages the holder indexing lever (42). As the tray indexing mechanism projection (78) moves forward, the lever (42) is forced back against spring tension, which allows the stop (44) to drop down. The stop (44) being out of the way allows the holder (18) to move to a second substantially vertical position shown in FIG. 7. The vertical wall of the housing stops and registers the slide holder in the second position shown in FIG. 7. The stop (44) may be provided with a spring (not shown) to force it down when the the lever (42) is out of the way. The slide (43) in the first receptacle is now free to be carried into the opening in the projector. As the projector continues its forward cycle of operation, the lifter mechanism (40) of the projector carries the slide (43) down into the projector for projection. Reference should be made to the above-referenced Robinson patent for a description of the operation of the slide lifter mechanism (column 8 of Robinson), and the indexing mechanism (column 9 of Robinson).

The lever (24) is released after the above-described cycle of operation of the slide projector mechanisms are complete. Releasing the lever allows the force of the coil spring (27) to return the lever to its initial position. Toward the end of the projector's forward cycle of operation, the tray indexing mechanism projection (78) moves back to its initial position, and the holder indexing lever (42) is released. The holder indexing lever is therefore free to be returned to its initial position by spring tension, which forces the stop (44) up into its initial position, when the lever (24) is released and the holder moves back to its initial position. The stop (44) being back in the way causes the holder (18) to stop at the position shown in FIG. 2 the next time the lever (24) is depressed.

The slide holder (18) shown in the various figures is pivotally mounted at one end by means of pins (19, 20). It will be understood by those skilled in the art that the pins must not interfere with the slides in the holder, and therefore do not extend completely through the holder. It is made in two sections, one section on each side of the holder. It will also be understood by those skilled in the art that the holder can be pivoted at any point so long as the pins do not interfere with the slides in the holder. For example, if the pivot point were at the center of the holder, the arc of the restraining means (26) would have a radius of one-half that shown in FIG. 2. The size of the entire mechanism can then be reduced accordingly. Conversely, if the holder were to be made twice as long as shown, and if the pivot point were extended accordingly, the arc of the restraining means (26) would have a radius of twice that shown in FIG. 2. The tray (29) could be made proportionately larger to accommodate more slides.

Figure 8:
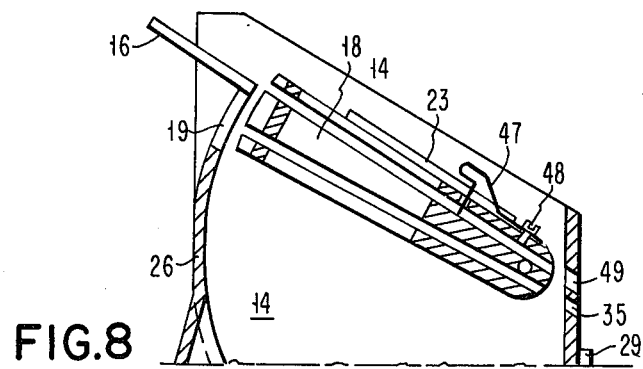

FIG. 8 is a vertical section taken through a second embodiment of the slide previewer/sorter/stack loader. In this embodiment, the first upper receptacle in the slide holder (18) has been extended to pass through the holder, the same as the second receptacle. A leaf spring slide retainer (47) passes through a hole in the upper part of the holder and is affixed thereto by means of a screw (48). The leaf spring functions to provide a stop for a slide in the first receptacle. If the leaf spring is pulled up, a slide in the first receptacle is free to drop out the back of the holder, through the slot (49) and into the bin in the tray (29). This allows one to reject any slide and prevent it from being projected.

SUMMARY

A slide-handling mechanism has been described which comprises holding means (18) having first and second receptacles, each for receiving a slide at one end thereof and for holding a slide therein. Lever (24) and pins (20) provide means for moving the holding means in the vertical plane from a preview position at an incline to horizontal to a substantially vertical position. A curved portion (26) provides first restraining means for restraining a slide in the first receptacle. A slot (28) in the curved portion (26) allows a slide to drop from the first receptacle when the holding means is in the vertical position.

A latch (50, 52) restrains a slide in the second receptacle, to prevent a slide from dropping out of the one end of the second receptacle when the holding means is in the vertical position. The latch (50, 52) will, however, allow a slide to be received in the one end of the second receptacle. The second receptacle is adapted to permit a slide therein to drop out of the end of the second receptacle opposite to the one end thereof when the holding means is in the preview position.

In accordance with an embodiment of the invention, the first receptacle may be modified to permit a slide therein to drop out of an end of the first receptacle opposite to the one end thereof when the holding means is in the preview position. To accomplish this, a leaf spring (47, FIG. 8) is provided on the holder (18), to selectively allow or not allow a slide to drop out of the other end of the first receptacle when the holding means is in the preview position.

When moved to the vertical position, the holding means is registered by a stop (44) above a slide gate of a slide projector, such that a slide in the projector can be lifted into the second receptacle in the holding means.

A slide holder indexing means (42), capable of operating in cooperation with a slide projector tray advance mechanism (78), is provided for disengaging the stop (44) to thereby allow the holding means to be indexed to a second substantially vertical position, such that a slide in the first receptacle in the holding means is allowed to drop into the projector.

A chute (16, 17) oriented at an incline to horizontal, provides a passage through which a slide may pass from an upper end of the chute to a lower end of the chute by force of gravity, the chute being located with respect to the holding means such that the lower end of the chute is in alignment with the first receptacle when the holding means is in the preview position. Thus, a slide placed on the chute at the upper end thereof drops by force of gravity to the lower end of the chute where the slide exits from the chute and into the first receptacle.

A slide bin (29) is positioned so as to be at the other end of the second receptacle when the holding means is in the preview position, such that a slide in the second receptacle is able to drop out of the second receptacle and into the slide bin when the holding means is in the preview position.

Furthermore, upon actuation of the leaf spring restraining means (47), a slide in the first receptacle is released to drop out of the end of the first receptacle and into the slide bin when the holding means is in the preview position.

The slide bin is one of a plurality of bins comprising a slide tray. A groove (38) engages a tongue (37) to hold the tray in place, such that any one of the plurality of bins can be selectively positioned to accept slides. Thus, slides can be sorted into different bins by repositioning the tray.

While the invention has been particularly shown and described with reference to preferred embodiments thereof, it will be understood by those skilled in the art that the foregoing and other changes in form and detail may be made therein without departing from the spirit and scope of the invention.

I claim:

1. A slide-handling mechanism comprising:
    a base member;
    holding means mounted to said base member;
    said holding means having a first receptacle for receiving a slide at one end thereof and for holding a slide therein, and a second receptacle for receiving a slide at one end thereof and for holding a slide therein;
    means for allowing said holding means to be moved in the vertical plane from a preview position at an incline to the horizontal plane to a substantially vertical position;
    said base member including first restraining means for restraining a slide in said first receptacle in said holding means, said first restraining means including means for allowing a slide to drop from said first receptacle in said holding means when said holding means is in said vertical position; and,
    second restraining means for restraining a slide in said second receptacle in said holding means, said second restraining means including means for preventing a slide from dropping out of said one end of said second receptacle in said holding means when said holding means is in said vertical position.

2. The combination in accordance with claim 1 wherein:
    said second restraining means is adapted to allow a slide to be received in said one end of said second receptacle, and wherein
    said second receptacle is adapted to permit a slide therein to drop out of another end of said second receptacle opposite to said one end thereof when said holding means is in said preview position.

3. The combination in accordance with claim 1 wherein:
    said first receptacle is adapted to permit a slide therein to drop out of another end of said first receptacle opposite to said one end thereof when said holding means is in said preview position; and,
    wherein said combination further comprises:
    third restraining means adapted to selectively allow or not allow a slide in said first receptacle to drop out of said another end of said first receptacle when said holding means is in said preview position.

4. The combination in accordance with claim 2 wherein:
    said first receptacle is adapted to permit a slide therein to drop out of another end of said first receptacle opposite to said one end thereof when said holding means is in said preview position; and,
    wherein said combination further comprises:
    third restraining means adapted to selectively allow or not allow a slide in said first receptacle to drop out of said another end of said first receptacle when said holding means is in said preview position.

5. The combination in accordance with claim 1 further comprising:
    first means for registering said holding means above a slide gate of a slide projector, such that a slide in said projector can be lifted into said second receptacle in said holding means when said holding means is in a first substantially vertical position.

6. The combination in accordance with claim 2 further comprising:
    first means for registering said holding means above a slide gate of a slide projector, such that a slide in said projector can be lifted into said second receptacle in said holding means when said holding means is in a first substantially vertical position.

7. The combination in accordance with claim 3 further comprising:
    first means for registering said holding means above a slide gate of a slide projector, such that a slide in said projector can be lifted into said second receptacle in said holding means when said holding means is in a first substantially vertical position.

8. The combination in accordance with claim 4 further comprising:
    first means for registering said holding means above a slide gate of a slide projector, such that a slide in said projector can be lifted into said second receptacle in said holding means when said holding means is in a first substantially vertical position.

9. The combination in accordance with claims 1, 2, 3, 4, 5, 6, 7, or 8, further comprising:
    second means for registering said holding means above a slide gate of a slide projector, such that a slide in said first receptacle in said holding means is allowed to drop into said projector when said holding means is in a second substantially vertical position.

10. The combination in accordance with claim 9 further comprising:
    slide holder indexing means, capable of operating in cooperation with a slide projector tray advance mechanism, for disengaging said first means for registering to thereby allow said holding means to be indexed to said second substantially vertical position, such that a slide in said first receptacle in said holding means is allowed to be lowered into said projector.

11. The combination in accordance with claims 2, 3, 4, 5, 6, 7, or 8, further comprising:
    a slide bin positioned so as to be at said another end of said second receptacle when said holding means is in said preview position, such that a slide in said second receptacle is able to drop out of said another end of said second receptacle and into said slide bin when said holding means is in said preview position.

12. The combination in accordance with claim 11 wherein said slide bin is one of a plurality of bins comprising a slide tray, said combination further comprising:
    means for holding said tray in place, such that any one of said plurality of bins can be selectively positioned to accept slides so that slides can be selectively sorted into different bins by repositioning said tray.

13. The combination in accordance with claims 3, 4, 5, 6, 7, or 8, further comprising:
   a slide bin positioned so as to be at said another end of said first receptacle when said holding means is in said preview position,
   such that, upon actuation of said third restraining means, a slide in said first receptacle is able to drop out of said another end of said first receptacle and into said slide bin, when said holding means is in said preview position, to thereby selectively permit or not permit a slide in said first receptacle to be dropped out of said first receptacle and into said bin when said holding means is in said preview position.

14. The combination in accordance with claim 13 wherein said slide bin is one of a plurality of bins comprising a slide tray, said combination further comprising:
   means for holding said tray in place, such that any one of said plurality of bins can be selectively positioned to accept slides so that slides can be selectively sorted into different bins by repositioning said tray.

* * * * *